United States Patent [19]

Weldy

[11] 4,039,001
[45] Aug. 2, 1977

[54] WATER STORAGE REFILL SYSTEM

[76] Inventor: Keith E. Weldy, 3218 Reeds Lake Blvd., Grand Rapids, Mich. 49506

[21] Appl. No.: 599,548

[22] Filed: July 28, 1975

[51] Int. Cl.² .................... F16K 21/18; B60R 15/00
[52] U.S. Cl. ............................ 137/389; 137/392; 137/599.1; 200/84 C
[58] Field of Search ............ 137/386, 389, 392, 393, 137/101.25, 110, 599.1; 73/308, 313; 169/24, 25; 200/84 C; 222/66; 251/61, 61.1, 61.2, 65

[56] References Cited

U.S. PATENT DOCUMENTS

| | | | |
|---|---|---|---|
| 1,351,781 | 9/1920 | Meushaw et al. | 137/599.1 |
| 2,642,747 | 6/1953 | Le Van | 137/389 |
| 3,181,556 | 5/1965 | Baker | 137/389 |
| 3,424,193 | 1/1969 | Dignam | 137/389 |
| 3,485,262 | 12/1969 | Perren | 137/392 |
| 3,667,500 | 6/1972 | Stone | 137/386 |
| 3,721,258 | 3/1973 | Dermiah et al. | 137/101.25 |
| 3,863,669 | 2/1975 | Ishida et al. | 137/386 |
| 3,870,076 | 3/1975 | Graznak | 137/389 |
| 3,876,037 | 4/1975 | Rath, Jr. | 137/392 |

*Primary Examiner*—Martin P. Schwadron
*Assistant Examiner*—G. L. Walton
*Attorney, Agent, or Firm*—Price, Heneveld, Huizenga & Cooper

[57] ABSTRACT

A water system for a mobile vehicle has an intermittent external source of water and uses water from an internal storage tank to provide a continuous supply of water. A water storage refill system automatically refills the internal storage tank whenever there is an external source of water. An inlet conduit is detachably connectable to an external water supply and in communication with the internal storage tank and the remainder of a plumbing system. An electrically actuated valve in the inlet conduit controls the flow of water from the external source of water to the internal storage tank in response to sensing devices indicating the need for water in the storage tank and the availability of water from the external water source.

13 Claims, 4 Drawing Figures

WATER STORAGE REFILL SYSTEM

BACKGROUND OF THE INVENTION

I. Field of the Invention

This invention relates to a mechanism for supplying water to and refilling the portable storage supply of mobile plumbing systems as in boats and vehicles commonly known as recreational vehicles.

II. Description of the Prior Art

There are a variety of known means for providing water within a mobile unit such as a marine or other recreational vehicle. For example, when the mobile unit is secured at a mooring or parking place, a direct connection can be made to the common water supply of a municipality or other external source. Additionally, it is known to provide a storage tank in the mobile unit for storing water to be used when a connection to the external water supply is not available.

While automatic systems are utilized in stationary plumbing installations such as in homes and commercial businesses, there has been no known successful system to provide a demand source and automatic refill apparatus which operates safely and adequately in small mobile vehicles such as pleasure boats and recreational vehicles which have so recently become an American way of life. To begin with, some such known systems utilize pressurized systems whereas the types of systems to which this invention typically relates generally utilizes nonpressurized storage tanks, the water pressure being supplied by a pump.

The known prior art utilizes a hand operated valve at the connection to the external water supply which supplies water directly to the plumbing system at the pressure of the external supply. The portable storage tank on the mobile unit is isolated from the external supply by a one-directional flow check valve which prevents flow into the storage tank from the external supply source. Typically, the mobile water storage tank in this type of arrangement is not designed to withstand municipal water pressures and exposure to such a pressure may rupture the tank. To refill the water storage tank, a separate capped opening is used as an inlet and the refill operation is manual. When the external water supply is not used, the one-way check valve is opened and water is supplied to the plumbing system from the storage tank through a pump which provides the desired pressure. Additional disadvantages of this type of system is that the tank must be located for access to permit refill. Often, such access is extremely cramped making such refilling operation a difficult chore at best. Also, unless an additional remote readout mechanism is provided, it is difficult to ascertain when the storage tank needs refilling. Even during the refilling operation as described, without some type of remote readout as to the existing water level, it is very difficult to ascertain when the tank is full without some type of overflow which by itself is not desired. Thus, there is a need in this particular art for an improved arrangement for supplying water to mobile systems when attached to an external water supply which at the same time provides automatic refill of the portable storage tank. Such a need of course requires fulfilling within reasonable economic arrangements.

SUMMARY OF THE INVENTION

In accordance with the invention, a portable plumbing system having a storage tank includes an inlet conduit detachably connectable to an external water supply. The inlet conduit is connected to a first conduit for supplying water to the storage tank and also is connected to a second conduit for providing water to the remainder of the plumbing system. A valve is provided in one of said inlet and first conduits to control the flow of water from the external supply to the storage tank. First means are provided for sensing a need for water in the storage tank while second means are provided for sensing the availability of water from the external supply. Third means electrically connected to the first and second means actuates the valve to permit filling of the storage tank when there is a need and availability of water for the tank.

In narrower aspects of the invention, a float rests on the surface of the water in the tank and has a rod extending therefrom externally of the tank with a magnet attached to the external end of the rod in close proximity to a magnetically operated electrical switch such that when a sufficiently high water level is not present in the storage tank, the switch is closed by magnetic action. A pressure switch in the inlet conduit having a diaphragm deflectable by the pressure of an external water supply is operable to close a second electrical switch indicating the presence of the external water supply thereby actuating a coil in series with the first switch to permit actuation of a third switch for opening the valve to permit flow to the storage tank. When either of the first or second switches are not closed, the water supply valve to the storage tank is closed.

A water storage refill system in accordance with an embodiment of this invention never overfills the water tank or causes the water tank to rupture. Furthermore, this system assures a full tank whenever the external water supply must be disconnected. That is, a full tank is assured when the mobile unit begins a transit. The water storage refill system operates automatically and does not require manually turning on or off the flow of external water into the water storage tank and does not require tending of the water storage tank during filling to determine when to turn off the flow of external water to the water storage tank. Further, such a system is particularly advantageous when access to the water storage tank is difficult such as when the water storage tank is in a low overhead compartment or in the engine compartment. Indeed, the tank can be located at a remote location thereby utilizing space which may otherwise go unused. The electrically operable valve is automatically and remotely controlled by permanently installed electrical switches which do not require manual attention. The plumbing connections to the water storage tank are also permanent and need not be accessible for filling of the tank. Only the water connection to the external water supply need advantageously be readily accessible.

DETAILED DESCRIPTION

Figure 1:
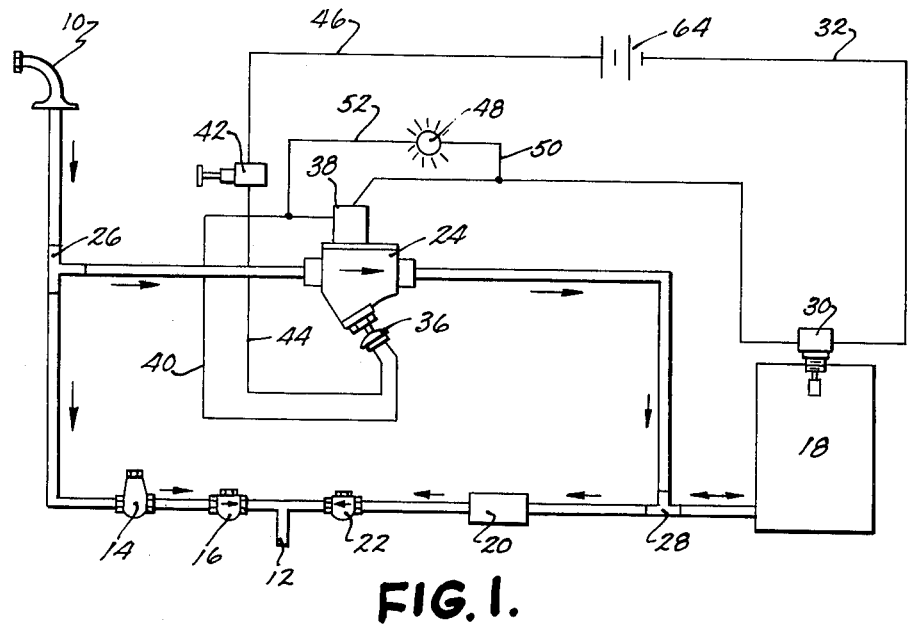
FIG. 1 is a partly schematic, partly block diagram of a water storage refill system in accordance with an embodiment of this invention.

Referring to FIG. 1, an external water supply inlet 10, such as an inlet for city water, can be detachably connected to a plumbing distribution system inlet 12 through a pressure regulator 14 and a check valve 16. Additionally, a water storage tank 18 can be connected to plumbing distribution inlet 12 through a pump 20 and a check valve 22. As is known, pressure regulators prevent damaging surges of pressure and check valves permit only unidirectional water flow.

In accordance with an embodiment of this invention shown in FIG. 1, an electrically operated solenoid water valve 24 is connected between water storage tank 18 and external water supply inlet 10. As is known in connection with solenoid valves, a diaphragm blocks flow of water through valve 24 until an associated coil 38 produces a magnetic field which acts to deflect the diaphragm and allow the passage of water through valve 24. A diaphragm 24a is mechanically coupled to coil 38 and controls the flow of water through a passage 24b within valve 24. A typical valve is Model 545 manufactured by the Horton Company of 25th and Smallman Street, Pittsburgh, Pennsylvania. Advantageously, installation of valve 24 can be made by connection of a first port of valve 24 to the third port of a T-fitting 26 having its other two ports connected between external water supply inlet 10 and pressure regulator 14. Valve 24 has its second port connected to the third port of a T-fitting 28 having its other two ports connected between pump 20 and water storage tank 18. By connecting valve 24 to T-fitting 28 it is not necessary to provide an additional opening in water storage tank 18 which is typically more difficult to do than the addition of a T-fitting in a plumbing connection. As a result, water is supplied to water storage tank 18 through the same connection through which water is drawn from water storage tank 18.

Coil 38 is electrically connected with a serial combination of a pressure operated electrical switch 36 for sensing the presence of pressure from the external water supply, a magnetically operated electrical switch 30 for sensing the water level in tank 18, a voltage source 64 and a panel on-off switch 42. A panel indicator lamp 48 is electrically connected in parallel across coil 38. Whenever current is flowing though coil 38, thereby opening valve 24 to the passage of water, lamp 48 is illuminated. The operation of pressure operated electrical switch 36 and magnetically operated electrical switch 30, which form part of the electrical circuit supplying current to activate coil 38, is described below.

Pressure operated electrical switch 36 is mechanically coupled to valve 24 to indicate the presence of external water supply pressure with a closed electrical circuit and the absence of external water supply pressure with an open electrical circuit. More specifically, an electrically conductive diaphragm 36a is deflected toward contacts 36b and 36c under the influence of water pressure at water supply inlet 10. An electrical circuit between contacts 36b and 36c is completed when diaphragm 36a is sufficiently deflected so it touches both contacts 36b and 36c. A typical pressure operated switch is Model 4000 Series manufactured by The Hobbs Division of Stewart-Warner Corporation, Yale Boulevard and Ash Street, Springfield, Illinois. Actuating coil 38 associated with valve 24 is electrically connected by a conductor 40 to a first terminal of pressure operated electrical switch 36. Actuating coil 38 is connected to magnetically operated electrical switch 30 by a conductor 34. Panel switch 42 is connected by a conductor 44 to a second terminal of pressure operated electrical switch 36. A voltage source 64 is connected to magnetically operated electrical switch 30 by a conductor 32 and to panel switch 42 by a conductor 46. Panel indicator lamp 48 is connected across coil 38 by conductors 50 and 52.

Figure 3:
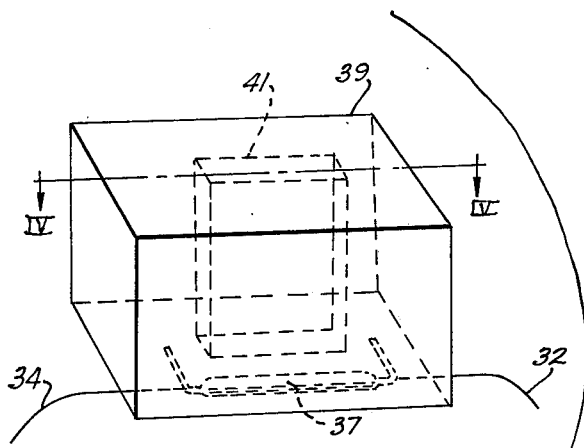
FIG. 3 is an exploded frontal perspective view of a magnetically operated electrical switch for sensing water level in a water storage tank in accordance with an embodiment of this invention.
Figure 3:
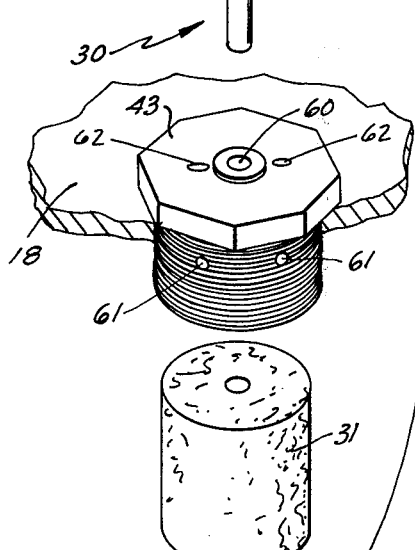

Magnetically operated electrical switch 30 is coupled to water storage tank 18 so changes in water level in tank 18 can be sensed. Typically, electrical switch 30 can be connected to tank 18 through the opening in a conventional water storage tank which would be used for manually filling the water tank. Referring to FIG. 3, a threaded fitting 43 screws into an inlet in water tank 18 and has a cylindrical central opening 60 along the axis of fitting 43 for passing an elongated rod 33 which connects to a float 31 inside tank 18 for following the level of the water in tank 18. Central opening 60 may have axial notches, or flutes, in its wall to reduce friction and prevent build-up of water deposited minerals. A permanent magnet 35 is attached to the top end of rod 33 outside tank 18 and is used to actuate a pair of reed magnetic contacts 37. Magnetic contacts 37 are encased in a block 39 mounted on fitting 43 and having a slotted opening 41 partially therethrough aligned to receive permanent magnet 35 when coupled to rod 33 which is vertically movable in opening 60 of fitting 43. Permanent magnet 35 fits slidably within slot 41 and is aligned to travel in a vertical direction. If desired, typically when tank 18 is not vented, magnetically operated electrical switch 30 can be self-vented through openings 61 in fitting 43 connecting the inside of tank 18 to the outside of tank 18 and does not pressurize water storage tank 18. Additional openings 62 in fitting 43 can connect the inside of tank 18 to the inside of slotted opening 41 thereby providing a drain for any moisture condensation which may take place in slotted opening 41. Electrical conductors 32 and 34 pass through block 39 and are connected to contacts 37 in magnetically operated electrical switch 30. Float 31 can be formed of an expanded plastic foam material and block 39 can be formed of a plastic resin material which is imperious to water and is electrically nonconductive.

Figure 4:
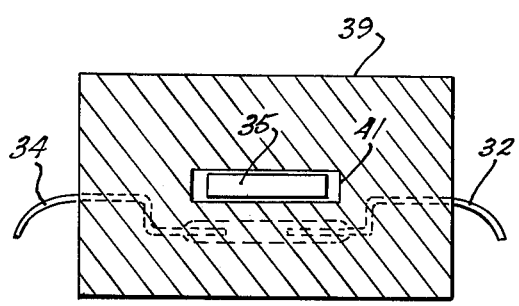
FIG. 4 is a cross-sectional view along section line IV—IV of FIG. 3.

Typically, contacts 37 are located near the base of block 39 and are sufficiently near slot 41 so contacts 37 can be activated by permanent magnet 35 when permanent magnet 35 is near the horizontal plane including contacts 37. When the water level in tank 18 is low enough to permit the connected assembly of float 31, rod 33 and permanet magnet 35 to be low enough so the magnetic field from permanent magnet 35 can close contacts 37, an electrical circuit is completed thereby permitting valve 24 to pass water and fill tank 18. As water enters tank 18, the rising water level in tank 18 causes float 31 to rise and pushes permanent magnet 35 out of the horizontal plane of contacts 37. When the magnetic field of permanent magnet 35 can no longer keep contacts 37 closed, the electrical circuit to valve 24 opens, closes valve 24 to the passage of water and water stops entering tank 18. It can be appreciated that the vertical length of slot 41 must be sufficient to remove the magnetic field of permanent magnet 35 sufficiently far from contacts 37 to prevent closing of contacts 37. Also, slot 41 must be sufficiently large to readily accommodate permanent magnet 35 without hindering its vertical travel. FIG. 4 shows a cross section of block 39 taken along section line IV—IV of FIG. 3. It can be seen that contacts 37 are completely encased in the material of block 39. Typically, contacts 37 are first encased in a sealed glass envelope which is then encased in block 39 rendering operation of contacts 37 safe even in an explosive atmosphere. Further, contacts 37 are spaced from slotted opening 41. Electrical conductors 32 and 34 pass through block 39 and are each connected to one of contacts 37.

Magnetically operated electrical switch 30 is advantageously installed near the center line of water storage tank 18. Should there be rocking of the mobile unit, for example a boat, there is a minimum water level change along the center line of tank 18. This is advantageous to prevent on-off cycling of the water refilling system in response to water level changes caused by rocking when float 31 is resting on the water surface. Excessive cycling could, of course, result in undesirable wear. Of course, magnetically operated electrical switch 30 allows for some rocking of the mobile unit without activating refill because of the travel of permanent magnet 35 within slotted opening 41 beyond contacts 37.

Figure 2:
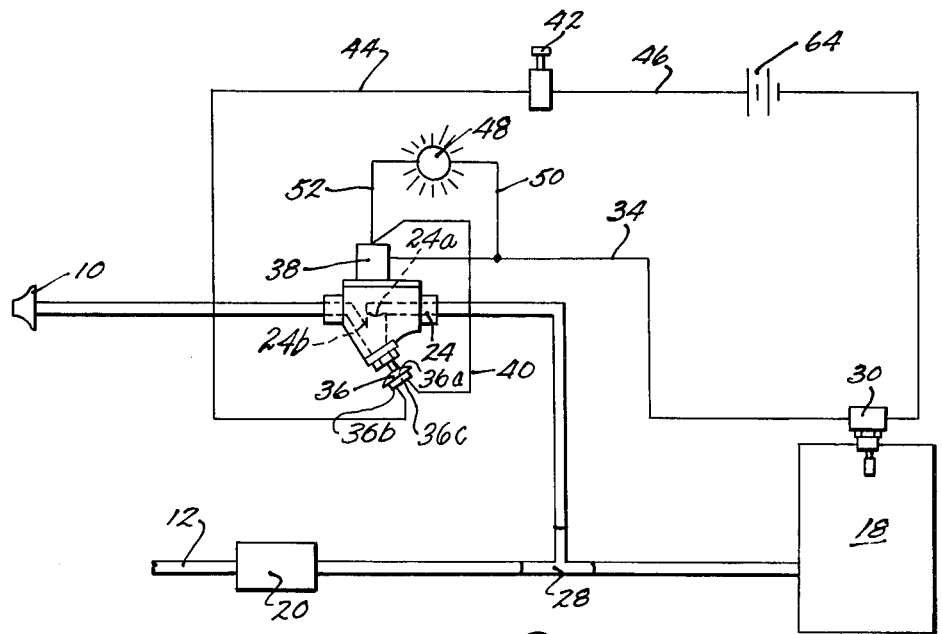
FIG. 2 is a partly schematic, partly block diagram of a water storage refill system in accordance with another embodiment of this invention.

FIG. 2 shows an alternative embodiment of an automatic water refill system in accordance with this invention. The connection is similar to the one shown in FIG. 1 but pressure regulator 14, check valve 16 and check valve 22 have been disconnected. Plumbing distribution system inlet 12 is connected to pump 20 and there is no direct connection between plumbing distribution system inlet 12 and external water supply inlet 10 except through pump 20. Since all water to plumbing distribution system inlet 12 from external water supply inlet 10 passes through valve 24, it is advantageous to adopt valve 24 to reduce pressure changes by having a water passage in valve 24 which is smaller in diameter than the pipe delivering water from valve 24. The numbering of elements common to both FIGS. 1 and 2 is the same. The electrical control system for valve 24 is as recited in connection with FIG. 1. That is, coil 38 is serially connected to voltage source 64 through pressure operated electrical switch 36, magnetically operated electrical switch 30 and panel switch 42. The connection of pump 20 to plumbing system inlet 12 means that pump 20 must operate whenever water is desired. Advantageously, all parts of the system exposed to water are constructed of noncorrosive material. For example, the plumbing connection of valve 24 is advantageously of copper or steel.

OPERATION

In the embodiment of the water refill system shown in FIG. 1, water flows through either check valve 16 or check valve 22 to plumbing distribution inlet 12. Typically, pump 20 is only used when there is no water available at external water supply inlet 10. When water is available at external water supply inlet 10, plumbing distribution system inlet 12 receives water flowing from external water supply inlet 10 through T-fitting 26, pressure regulator 14 and check valve 16. Additionally, water can flow from T-fitting 26 to valve 24. Pressure operated electrical switch 36 senses the presence of external water supply pressure and closes to indicate the presence of the water pressure. Contacts 37 in magnetically operated electrical switch 30 close to indicate the presence of a low water level in tank 18. If panel switch 42 has been turned on to permit automatic filling of tank 18, a complete circuit is made from voltage source 64 to coil 38 through contacts 37, pressure operated electrical switch 36 and panel switch 42. Current flows through this complete electrical circuit to coil 38 thereby opening valve 24 and permitting water to flow through valve 24 to T-fitting 28. Panel indicator lamp 48 illuminates to alert the user of the filling process and operation of the system. Pump 20 is not operational and, accordingly, water flows from T-fitting 28 to water storage tank 18. This flow continues until the water level in water storage tank 18 is high enough to open contacts 37 in magnetically operated electrical switch 30. When contacts 37 are open the circuit providing current to coil 38 is opened and valve 24 closes to stop flow of water to water storage tank 18.

As a result, there has been an automatic filling of water storage tank 18. The proper water level in tank 18 will be automatically maintained as long as there is a connection to an external water supply. It is particularly advantageous that the proper level is available in water storage tank 18 just prior to disconnection from an external water supply thereby assuring a full tank when leaving the availability of the external water supply. For example, maximum supply of water in a boat may even be considered to be a safety feature with life saving value. Panel switch 42 provides the option of disconnecting the storage refill system by opening the electrical circuit which is used to provide current to coil 38 for opening valve 24 to the passage of water. Thus, if switch 42 is open, even the availability of an external water supply and the need for water in water storage tank 18 will not actuate coil 38 to open valve 24 thereby permitting flow of water to tank 18. The water storage refill system draws current from voltage source 64 only when water storage tank 18 is filling. It is only at this time that coil 38 must be actuated to open valve 24 and permit the flow of water. An example of power consumption for valve 24 is about 10 watts. Typically, with a 12 volt battery a current of only about 0.9 amperes is drawn.

An alternate installation of the water refill system shown in FIG. 2 requires that pump 20 always operate when water is supplied to the plumbing distribution system. This is in contrast to the system in FIG. 1 which had a direct connection to the external water supply, by-passing pump 20, and utilized the pressure of the external water supply. To fill any demand for water in the system shown in FIG. 2, pump 20 operates and draws water from water tank 18. Accordingly, the water level in tank 18 drops and continued water usage will eventually drop it to a level where permanent magnet 35 will act to close contacts 37. If pressure operated electrical switch 36 indicates a presence of external water supply pressure and if panel switch 42 is in "on" position, valve 24 passes water. The water goes to T-fitting 28 and then to tank 18 causing the water level in tank 18 to rise. If pump 20 is still operating in response to a demand for water, some of the water may directly be passed through pump 20. If pump 20 is not operating, all water from the external water supply flowing through valve 24 enters tank 18. When the water level in tank 18 is sufficiently high and contacts 37 open, valve 24 closes to the passage of water. It can be appreciated that in this system the water in tank 18 is recycled even during extended periods of availability of an external supply of water. In contrast, in the system of FIG. 1, when an external supply of water is available, the water in tank 18 is not recycled and remains stored while water from the external source is used to meet any demand for water. Although pump 20 must operate whenever water is desired in the system shown in FIG. 2, there are generally available low power pumps which can consume an advantageously small amount of power. Further, an external power supply is typically available when there is an external water supply available.

Various modifications and variations will no doubt occur to those skilled in the various arts to which this invention pertains. For example, the particular connection of the pressure operated electrical switch and the valve controlling the flow of water to the water storage tank can be accomplished in a manner different from that disclosed here. Solid state components such as transistors, rectifying diodes and light emitting diodes may be used as components of the water storage refill system. These and all other variations which basically rely on the teachings through which this disclosure has advanced the art are properly considered within the scope of this invention as defined by the appended claims.

The embodiments of the invention in which an exclusive property or privilege is claimed are defined as follows:

1. A water supply and storage refill system for a portable plumbing system having a water storage tank comprising, in combination:
    an inlet conduit detachably connectable to an external water supply, said inlet conduit being in communication with a first conduit to said storage tank and alternatively through a second conduit to the remainder of said plumbing system;
    a valve in one of said inlet conduit and first conduit for controlling the supply of water to said storage tank;
    first means for sensing a need for water in said storage tank including a float resting on the surface of the water in the water storage tank;
    second means for sensing the availability of water from an external water supply;
    third means electrically connected to said first and second means to actuate said valve to permit passage of water from the external water supply to said storage tank when there is need for water in said storage tank and an availability from an external water supply;
    a rod having a first end connected to the floor and extending upward outside the water storage tank;
    a permanent magnet attached to the second end of said rod;
    a magnetically operated electrical switch positioned in close proximity to said permanent magnet such that when a sufficiently high water level is not present in the water storage tank the permanent magnet can close the switch; and
    said second means comprising a pressure operated electrical switch assembly having a diaphragm which can be deflected by the pressure of said external water and close an electrical switch to indicate the presence of said external water supply pressure.

2. A water supply and storage refill system as recited in claim 1 wherein the valve comprises:
    a movable blocking diaphragm in the water passageway of the valve for selectively passing water through the valve; and
    a coil magnetically coupled to the movable diaphragm and electrically connected in series to the first means and the second means.

3. A water supply and storage refill system as recited in claim 2 wherein there is an on/off panel switch connected electrically in series with the coil.

4. A water supply and storage refill system as recited in claim 3 wherein there is a panel indicator lamp connected electrically in parallel with the coil for indicating electrical current flowing in the coil.

5. A water supply and storage refill system as recited in claim 4 wherein the water storage tank has only two openings, one opening for the input and output of water and a second opening for passing the rod of the first means.

6. A water supply and storage refill system as recited in claim 5 wherein the magnetically operated electrical switch is encapsulated within a plastic block having a slotted opening partially through the block for permitting vertical movement of the permanent magnet and having electrical conductors passing through the block to electrically contact the electrical switch.

7. A water supply and storage refill system for a portable plumbing system having an inlet from an external water supply and an inlet from a water storage tank comprising:
    a float resting on the surface of the water in the water storage tank;
    a rod having a first end connected to the float and extending to the outside of the water storage tank;
    a permanent magnet attached to the second end of said rod;
    a magnetically operated electrical switch positioned in close proximity to said permanent magnet such that when a sufficiently high water level is not present in the water storage tank the permanent magnet can close the switch;
    a pressure operated electrical switch assembly coupled to said inlet from an external water supply having a diaphragm which can be deflected by the pressure of said external water supply and close an associated electrical switch thereby indicating the presence of said external water pressure;
    an electrically operable valve connecting said external water supply to the water storage tank;
    a movable blocking diaphragm in the water passageway of the valve for selectively passing water through the valve;
    a coil magnetically coupled to the movable diaphragm and electrically connected in series to the magnetically operated electrical switch and the pressure operated electrical switch assembly for moving the blocking member when there is a closed electrical circuit to the coil; and
    indicator means for indicating electrical current flowing in the coil.

8. A water supply and storage refill system as recited in claim 7 further comprising:
    a pump connected between the plumbing system and the water storage tank.

9. A water supply and storage refill system for a portable plumbing system having a first inlet from an external water supply including:
    a second inlet to the plumbing system for conducting flow of water to the plumbing system;
    a T-fitting having a first opening, a second opening, and a third opening, the first opening being connected to said second inlet;

a water storage tank having an opening connected to the second opening of the T-fitting;

an electrically operated solenoid valve connected to the third opening of the T-fitting and adapted to receive and control the flow of said external water supply from said first inlet;

first means coupled mechanically and electrically to the solenoid valve for sensing the availability of said external water supply; and second means coupled mechanically to the water storage tank and electrically connected to the solenoid valve for sensing a need for water in the water storage tank.

10. A water supply and storage refill system as recited in claim 9 and further comprising:

a pump connected between said second inlet to the plumbing system and said first opening of the T-fitting for pumping water to the plumbing system.

11. A water supply and storage refill system for a portable plumbing system having a first inlet from an external water supply including:

a second inlet to the plumbing system;

a T-fitting having a first opening, a second opening, and a third opening, the first opening being connected to said second inlet;

a water storage tank having an opening connected to the second opening of the T-fitting;

an electrically operated solenoid valve connected to the third opening of the T-fitting and adapted to receive and control the flow from said first inlet of water from said external water supply;

first means coupled mechanically and electrically to the solenoid valve for sensing the availability of said external water supply;

second means coupled mechanically to the water storage tank and electrically connected to the solenoid valve for sensing a need for water in the water storage tank;

a pump connected between said second inlet to the plumbing system and said first opening of the T-fitting for pumping water to the plumbing system; and said first means including:

a float resting on the surface of the water in the water storage tank;

a rod having a first end connected to the float and extending upward outside the water storage tank;

a permanent magnet attached to the second end of said rod; and a magnetically operated electrical switch positioned in close proximity to said permanent magnet such that when a sufficiently high water level is not present in the water storage tank the permanent magnet can close the switch.

12. A water supply and storage refill system as recited in claim 11 wherein the magnetically operated electrical switch is encapsulated within a plastic block having a slotted opening partially through the block for permitting vertical movement of the permanent magnet and has electrical conductors passing through the plastic block to contact the magnetically operable electrical switch.

13. A water supply and storage refill system as recited in claim 12 wherein the float comprises a foamed plastic material.

* * * * *